(12) United States Patent
Dawes et al.

(10) Patent No.: US 7,097,880 B2
(45) Date of Patent: Aug. 29, 2006

(54) METHOD FOR PREPARING CATALYSTS

(75) Inventors: Steven B. Dawes, Corning, NY (US); Prantik Mazumder, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 186 days.

(21) Appl. No.: 10/742,279

(22) Filed: Dec. 18, 2003

(65) Prior Publication Data

US 2005/0136183 A1    Jun. 23, 2005

(51) Int. Cl.
B05D 1/18    (2006.01)
B05D 3/00    (2006.01)

(52) U.S. Cl. ............. 427/294; 427/372.2; 427/374.1; 427/430.1

(58) Field of Classification Search ......... 502/211, 502/255, 259, 305, 315, 321, 322, 323, 326, 502/327, 335, 337, 415, 439, 527.19; 427/294, 427/372.2, 430.1, 374.1
See application file for complete search history.

(56) References Cited

U.S. PATENT DOCUMENTS

| 4,039,482 A | 8/1977 | Hoyer et al. |
| 4,066,801 A | 1/1978 | Hoyer et al. |
| 4,208,454 A | 6/1980 | Reed et al. |
| 4,483,691 A * | 11/1984 | McShea et al. ............... 48/202 |
| 4,550,034 A | 10/1985 | Shimrock et al. |
| 6,521,566 B1 * | 2/2003 | Magno et al. ............... 502/325 |
| 6,610,628 B1 * | 8/2003 | Nordquist et al. .......... 502/159 |
| 6,670,305 B1 * | 12/2003 | Bae et al. ............. 502/527.12 |
| 6,790,417 B1 * | 9/2004 | Boger ........................ 422/222 |
| 6,881,703 B1 * | 4/2005 | Cutler et al. ................ 502/439 |
| 2001/0026838 A1 | 10/2001 | Dettling et al. |

FOREIGN PATENT DOCUMENTS

EP    0 202 733    7/1991

OTHER PUBLICATIONS

Nijhuis et al., "Preparation of Monolith Catalysts", Catalysis Reviews, 43(4), 345-380, 2001, p. 345-380.
Vergunst et al., "Monolithic catalysts—non-uniform active phase distribution by impregnation", Applied Catalysts A: General 213, 2001, p. 179-187.

* cited by examiner

Primary Examiner—Cam N. Nguyen
(74) Attorney, Agent, or Firm—Randall S. Wayland; Anca C. Gheorghiu

(57) ABSTRACT

A method for impregnating porous monolith supports with catalytically active materials is disclosed. The impregnation is carried out at a temperature which substantially reduces chemisorption rates such that reactions between the monolith substrate and catalytically active materials in the catalyst solution are minimized. The process can be completed in a practical time that allows for unit selectivity of the weight ratio of catalytically active materials in the substrate to the weight ratio of catalytically active materials in the catalyst solution.

6 Claims, 3 Drawing Sheets

METHOD FOR PREPARING CATALYSTS

BACKGROUND OF THE INVENTION

The present invention relates to a method for preparing catalysts, and in particular to a method for impregnating monolithic catalyst supports, such as honeycomb structures, which substantially reduces preferential loading and achieves unit selectivity.

Catalyst impregnation is one of the most crucial steps for preparing industrial catalysts, such as those useful in hydrotreating applications. Generally, high surface area oxide substrates or supports are loaded with one or more catalytically active materials, such as noble and/or base metals. Two widely-known impregnation techniques include pore volume impregnation (PVI), and excess solution impregnation (ESI).

PVI which is used with pellets or beads catalyst supports, involves the use of a catalyst solution of a volume equivalent to or slightly less than the total pore volume of the supports. The liquid solution penetrates and fills up the support pore volume, delivering a specific amount of metal into the pores. Following imbibation (i.e., complete filling of the pore volume with the available liquid solution) the pellet supports are dried to remove excess water, and achieve the desired metal concentration. Advantages of the PVI technique include easy determination of the catalyst volume solution required, and unit selectivities (i.e., the weight ratios of the catalytically active materials in the solution are equal to the weight ratios of the catalytically active materials in the substrate).

However, pore volume impregnation is not readily applicable to monolithic catalyst supports due to the complexity and rigidity of their shape. Simply absorbing the volume of solution equivalent to the volume of the support, generally results in very poorly distributed catalysts. Therefore, honeycomb supports are usually impregnated with a catalyst solution having a volume that exceeds the support's pore volume. This technique is known as excess solution impregnation or ESI. The honeycomb support is fully submerged in the catalyst solution over an extended period of time. The solution penetrates the pores of the support due to capillary pressure and fills up the available pore volume.

A disadvantage of the ESI technique, is the interaction that occurs between the surface of the support and the catalyst solution because the various catalytically active materials have different chemisorption rates or react at different rates and to different equilibrium levels. This leads to "preferential loading" of some metals over others, and unit selectivities cannot be achieved.

It is extremely important for any large scale impregnation process to have selectivities as close to unity as possible, in order to be commercially viable. If the selectivities are far from unity, the relative metal concentrations in the solution will differ before and after impregnation and the composition of the solution will change over time. This renders the catalyst solution unusable after a period leading to material loss and excessive cost. Further, to achieve the desired catalyst composition, the impregnation solution must be optimized independently for each process, which results in further costs and inefficient processing.

There is, thus, a need for an improved method to impregnate porous monolithic supports to reduce preferential loading and achieve unit selectivities, and provide a process that is cost-effective and efficient.

SUMMARY OF THE INVENTION

The present invention meets this need by providing a method for impregnating monolithic substrates with catalytically active materials which attains unit selectivities for all species loaded onto the catalyst substrate. It has been found that by controlling the temperature at which the impregnation technique is carried out, chemisorption rates can be substantially minimized and unit selectivities attained. Selectivity is defined as the ratio of the weight percentages of metal(s) in the substrate in relation to the weight ratio of metal(s) in the catalyst solution.

Specifically, unit selectivity is defined as $$S_{ij} = \frac{(y_i/y_j)}{(x_i/x_j)} \sim 1,$$

where $y_i$ is the weight % of the $i^{th}$ catalytically active material and $y_j$ is the weight % of the $j^{th}$ catalytically active material in the substrate, and $x_i$ is the weight % of the $i^{th}$ catalytically active material and $x_j$ is the weight % of the $j^{th}$ catalytically active material in the catalyst solution. To obtain selectivity close to unity or 1 the ratio of the catalytically active materials in the substrate must be kept substantially similar to the ratio of the catalytically active materials in the catalyst solution. However, it must be noted that even for single component systems unit selectivities are desirable.

It is also desirable that each catalytically active material be present at a calculated pore volume level, where the actual mass of each component loaded onto the porous support ($M_{pv}$) is equal to the percent weight of the catalytically active material in the catalyst solution (x) multiplied by the pore volume (PV) of the support and further multiplied by the density of the solution ($\rho$), or $M_{pv}=x(PV)\rho$. Thus, depending on the geometry of the sample, a minimum time may be required to fill the pores with the catalyst solution to achieve the pore volume calculate level.

With the process of the present invention it is possible to attain unit selectivities of all catalytically active materials loaded onto the substrate while employing the excess solution impregnation technique which is best suitable for impregnating honeycomb structures. This is a significant advantage over existing excess solution and pore volume impregnation techniques where selectivities for monolithic catalyst supports are far from unity, and hence are not commercially efficient and cost effective.

In practice there is first provided a system comprising a pressure tight chamber in communication with a vessel containing a catalyst solution having catalytically active materials. A monolith substrate, such as a honeycomb structure having a plurality of cell passages between end faces thereof, is placed in the pressure tight chamber. Next the pressure tight chamber is purged, and then filled with a dry gas, such as $N_2$.

The entire system (including the pressure tight chamber, vessel, catalyst solution, and monolith substrate, as well as any other components) is cooled to a temperature sufficient to substantially reduce chemisorption rates between the monolith substrate and catalytically active materials in the solution. Subsequently, a vacuum is exerted on the pressure tight chamber, which thereafter is filled with the catalyst solution. The monolith substrate is maintained in contact with the catalyst solution for a time sufficient to insure that all the available pore volume is filled with the catalyst solution.

Then, the pressure tight chamber is emptied of the catalyst solution, and the monolith substrate is removed. Any remaining catalyst solution is blown-away, with, for example, pressurized air. The impregnated monolith substrate is then further optionally dried and calcined, according to practices known in the art, to form a final product structure.

BRIEF DESCRIPTION OF THE DRAWINGS

The invention may be further understood by reference to the following drawings, wherein.

DETAILED DESCRIPTION OF THE INVENTION

Figure 1:
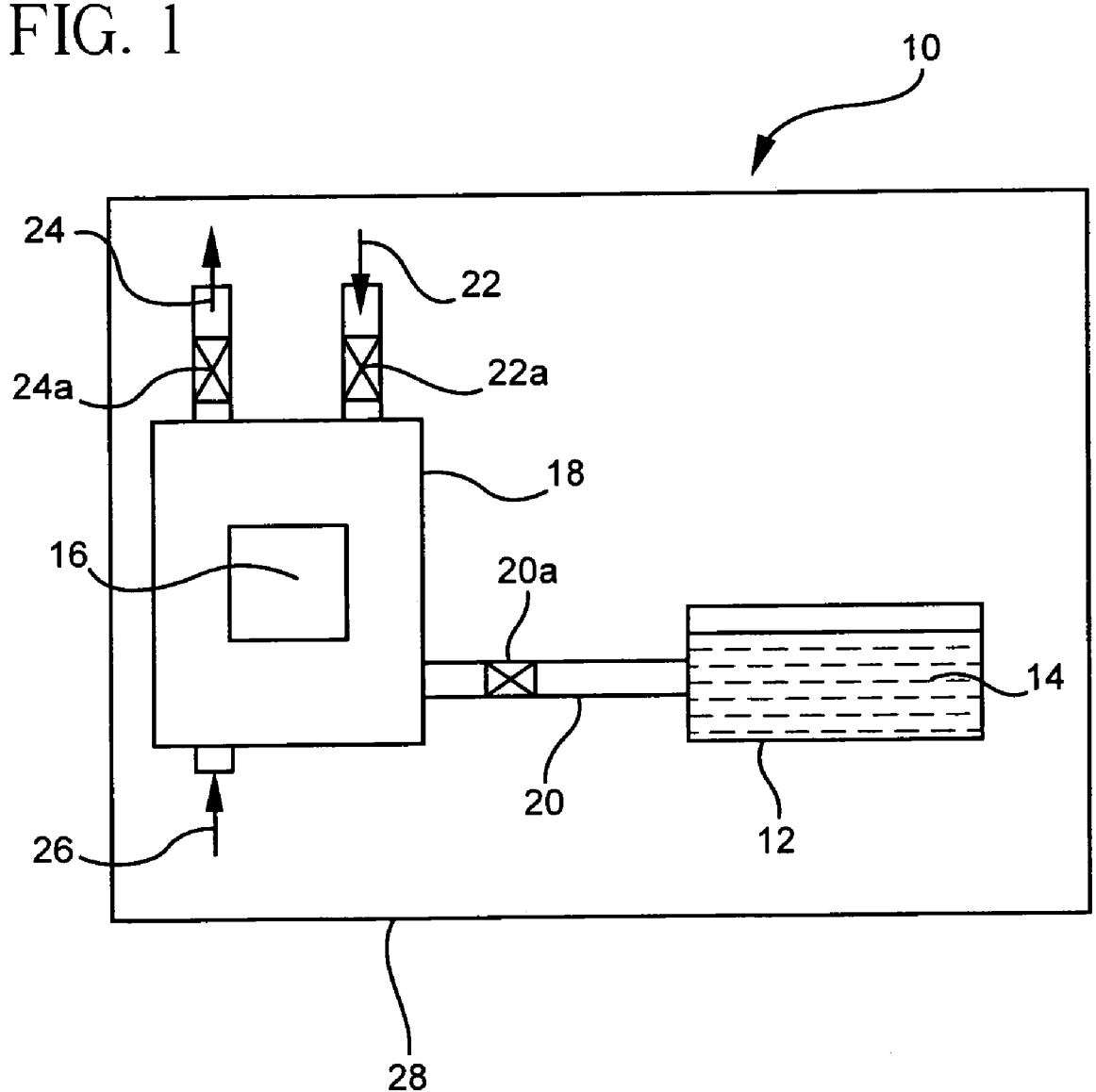
FIG. 1 illustrates a schematic of the system and impregnation process according to the present invention.

Referring to FIG. 1 there is provided a preferred embodiment of a system 10 according to the invention for impregnating a monolithic substrate with a solution of catalytically active materials. Therein presented is a vessel 12 containing catalyst solution 14, vessel 12 being in communication with a pressure tight chamber 18 housing a honeycomb substrate 16 positioned vertically therein, and supported by suitable means (not shown). Specifically, a vessel outlet 20 and valve 20a control the amount of catalyst solution 14 delivered to the pressure tight chamber 18. Honeycomb 16 is a ceramic monolith substrate having a plurality of channels extending between end faces thereof. The shape of the honeycomb 16 is most commonly cylindrical, with any other shape being equally suitable.

Chamber 18 is provided with chamber inlet 22 and corresponding valve 22a, and with chamber outlet 24 and corresponding valve 24a. Chamber outlet 24 is connected, at a remote end, to a source of vacuum (not shown) such as an exhaust pump for maintaining a desired subatmospheric pressure level in chamber 18. Vacuum gage 26 indicates the level of subatmospheric pressure in chamber 18.

A critical aspect of the invention is that during the impregnation process, all components of system 10 should be maintained at a temperature at which chemisorption rates between honeycomb 16 and catalytically active materials in catalyst solution 14 are substantially reduced such that unit selectivities can be achieved. To achieve this it has been found that the impregnation process should be carried out at an operational temperature ($T_o$) in the range between ($T_f+2°$ C.)<$T_o$<(RT−5° C.), where RT is room temperature and $T_f$ is the freezing point of the catalyst solution. It is to be noted that $T_o$ depends on the catalyst solution employed, and may vary as a function of $T_f$. In a preferred embodiment ($T_f+2°$ C.)<$T_o$<15° C. In a more preferred embodiment ($T_f+2°$ C.)<$T_o$<0° C., and in a most preferred embodiment ($T_f+2°$ C.)<$T_o$<−5° C.

Operating at $T_o$ can be accomplished by housing system 10 in a cooling device 28, as shown in FIG. 1 to control the temperature thereof during impregnation. In a preferred embodiment cooling device 28 comprises a refrigeration unit. This set-up insures that all components of system 10 are simultaneously maintained at $T_o$. Alternatively, cooling means (not shown) can be attached to both vessel 12 and chamber 18 individually, to control temperature of each in a functionally equivalent manner.

In operation, chamber 18 is first purged, and then filled with a dry gas, preferably $N_2$, using chamber inlet 22 and valve 22a, and chamber outlet 24 and valve 24a. The purging operation can also be performed alternating between the vacuum and catalyst solution filling procedures. Once chamber 18 is filled with $N_2$ all connecting valves are closed to isolate honeycomb 16 from ambient air and the catalyst solution 14.

Next system 10 is cooled to $T_o$, and valve 24a is opened to pull a vacuum at outlet 24 to achieve a pressure of 10 to 760 Torr, preferably 10–100 Torr within chamber 18, while maintaining valves 20a and 22a closed. Once the desired reduced atmosphere is obtained, valve 20a is opened to pump catalyst solution 14 through vessel outlet 20 into chamber 18, for impregnation of honeycomb 16. The catalyst solution used in the practice of the invention has a volume greater than the pore volume of the honeycomb substrate, and contains catalytically active materials, such as metals or metal oxides. In a preferred embodiment the catalyst solution is a mixture of molybdenum oxide, nickel carbonate, and phosphoric acid.

The honeycomb substrate 16 is maintained in contact with the catalyst solution 14 for a time (i.e., soak time) sufficient to fill the available pore volume with catalyst solution. The actual mass of each catalytically active component loaded onto the substrate ($M_{pv}$) is equal to the percent weight of the catalytically active material in the catalyst solution (x) multiplied by the pore volume (PV) of the support and further multiplied by the density of the solution ($\rho$), or $M_{pv}=x(PV)\rho$. From the foregoing equation the minimum soak time can be determined while also taking into account the geometry and pore size distribution of the substrate. In a preferred embodiment, the soak time is 0.5 to 10 minutes, and more preferably 2 to 5 minutes.

Following impregnation chamber 18 is drained of catalyst solution 14, and honeycomb 16 is then removed. Excess catalyst solution 14 is blown off the surface of honeycomb 16 by any suitable means such as with pressurized air to remove excess fluid and to preclude any undesired passageway blocking. Next the substrate is dried at temperatures of 80–100° C. to remove free water and insure adhesion of the catalyst metals. The dried substrate is further processed, e.g., calcined at temperatures of 450–550° C. as known in the art.

The invention is further described in the following examples, which are intended to be illustrative rather than limiting.

EXAMPLES

In a first set of experiments a series of honeycomb substrates composed of gamma alumina (F-1) having properties as presented in Table 1, are impregnated with a catalyst solution containing a mixture of molybdenum oxide, nickel carbonate, and phosphoric acid, and having a $T_f$ equal to −10° C. Catalyst solutions containing combinations of nickel, molybdenum and phosphorus are known for hydrotreating catalyst preparations as described in U.S. Pat. Nos. 6,531,054, 6,576,584, 6,589,908, and 6,620,313. In Table I, the surface area (m²/g) is measured by nitrogen BET, with pore volume (ml/g), median pore size (Å) and distribution (% pore volume>350Å) being measured by mercury intrusion proximity.

The impregnation is carried out at temperatures of −6° C., 20° C. and 60° C., and soak times of 5, 15, and 30 minutes. Selectivites for Mo/Ni and Mo/P ratios are calculated from measured weight fractions of Mo, Ni, and P normalized by the weight ratios of Mo/Ni and Mo/P in the initial catalyst solution. The data is plotted in FIG. 2 and shows selectivity as a function of impregnation temperature (° C.) and soak time (minutes).

Figure 2:
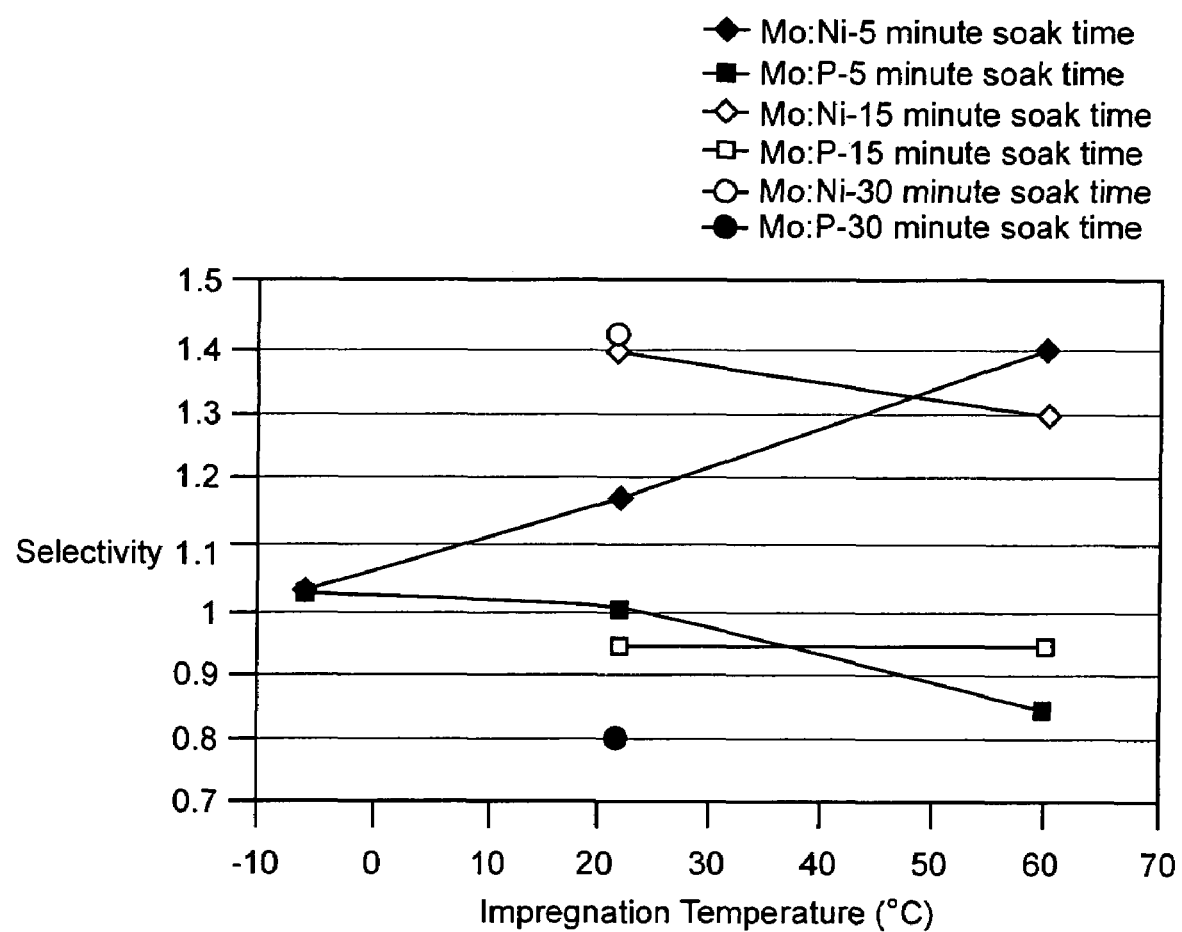
FIG. 2 is a plot showing selectivity as a function of impregnation temperature (° C.) and time (minutes) for a first set of experiments, according to the practice of the present invention; and, FIG. 3 is a plot showing selectivity as a function of impregnation temperature (° C.) and time (minutes) for a second set of experiments, according to the practice of the present invention.

For 5 minute soak time experiments, the Mo/Ni selectivity increased with increasing temperature from 1.03 at a −6° C. to 1.17 at 22° C. to 1.39 at 60° C. Consequently, unit selectivity is achieved only in the low temperature impregnation condition. Also shown in FIG. 2 is Mo/P selectivity, which is about 1.0 at −6° C., and at 20° C., but decreases to 0.83 at 60° C. The results at −6° C. show very close correspondence to targeted levels of all three catalyst metals. In, addition, the total metal loading of all three metals is equal to the pore volume calculated level, indicating that the soak time is sufficient for complete imbibation of the porosity with the catalyst solution.

Figure 3:
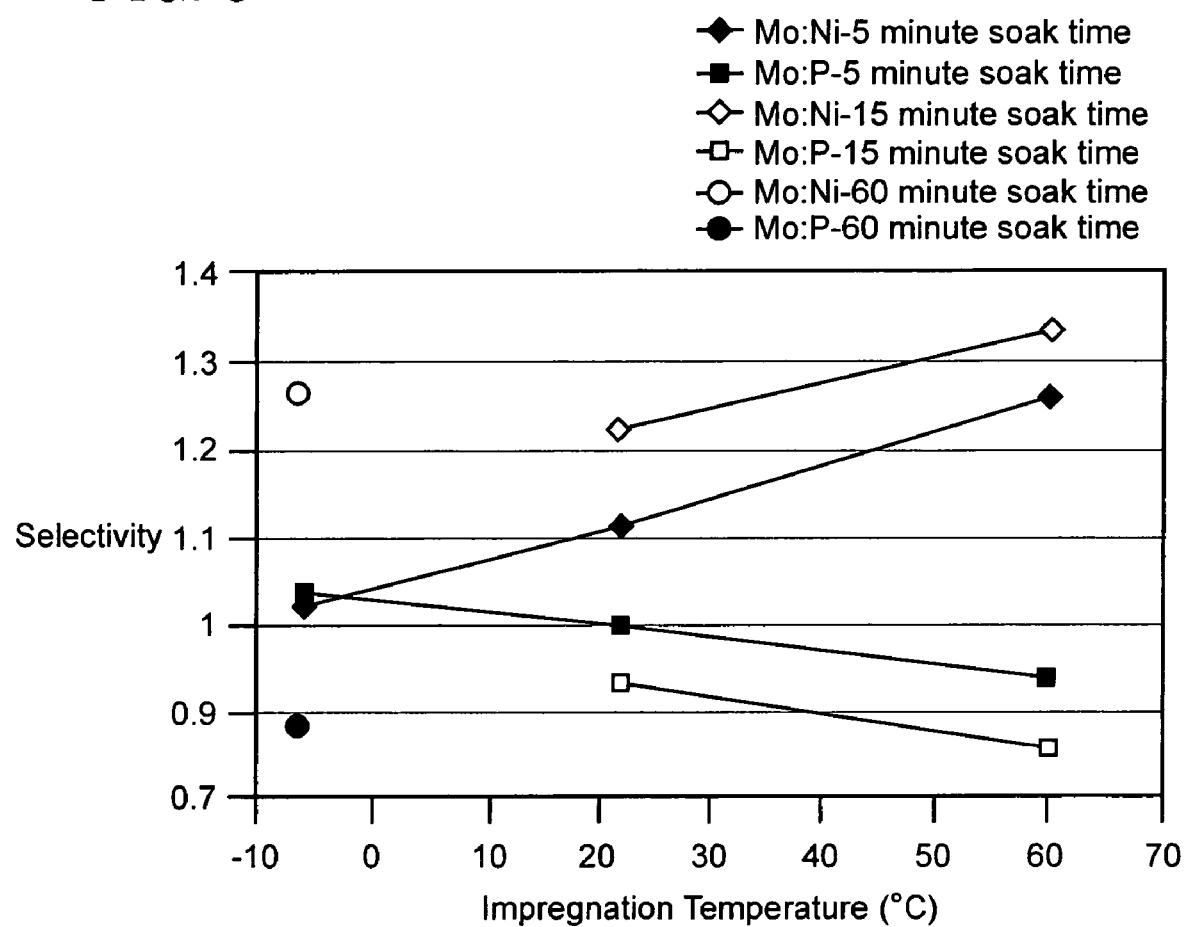

In a second set of experiments the same temperature conditions described above were followed, with an additional soak time of 60 minutes at −6° C. also shown. The substrates used were a gamma-alumina (F-2) with physical properties as provided in Table 1. The results are plotted in FIG. 3. For the 5 minute soak time at −6° C., the Mo/Ni selectivity obtained was about 1.02, while the Mo/P selectivity was 1.03. Increasing the soak time and/or the catalyst impregnation temperature results in degrading selectivities for Mo/Ni and Mo/P weight ratios. The low temperature, short soak time conditions results replicate the results of the first set of experiments on F1 substrates. Only the degree to which the selectivity varies with increasing soak time and/or impregnation temperature is dependent on the properties of the high surface area support.

Both soak time and impregnation temperature, which are kinetic factors, have significant impact on selectivity in the range of 5 to 60 minutes, and −5° to 60° C., respectively. Specifically, low impregnation temperature and reduced soak time promote selectivities approaching unity or 1.0. Soak time can be decreased only to the extent that all of the volume porosity in the substrate is filled. In the case of gamma alumina extrudates the time needed to fill up the available pore volume is equal to or greater than 2 minutes. Below 2 minutes the total catalyst loading is less than that expected if the pores were to fill with solution. The impregnation temperature can be decreased to just slightly above the freezing point of the solution, with colder processing providing better selectivity.

The examples demonstrate the feasibility of the present invention to achieve unity selectivities based on kinetic control of chemical or chemisorption reactions that occur during impregnation processing. For uniform metals distribution on cellular ceramic forms using a continuous or excess solution impregnation technique, the present low temperature impregnation method offers a route toward improved processing with less waste than can be achieved without kinetic control of the process.

TABLE 1

Physical properties of the gamma-alumina F1 and F2 substrates used in examples.

| Sample (gamma-alumina) | Surface Area (m²/g) | Pore Volume (ml/g) | Median Pore Size (Å) | % Pore Volume > 350 Å |
|---|---|---|---|---|
| F-1 | 243 | 0.64 | 108 | 7.3 |
| F-2 | 260 | 0.99 | 126 | 23.8 |

What is claimed:

1. A method for impregnating a monolith substrate comprising:
   a. providing a system comprising a pressure tight chamber in communication with a vessel containing a catalyst solution including catalytically active materials;
   b. placing a monolith substrate in the pressure tight chamber;
   c. first purging, and then filling the pressure tight chamber with a dry gas;
   d. cooling the system including the monolith substrate to a temperature in the range between $(T_f+2°\ C.)<T_o<(RT-5°\ C.)$, where $T_o$ is operational temperature, RT is room temperature and $T_f$ is the freezing point of the catalyst solution, wherein the temperature in the range provided is chosen to substantially reduce chemisorption rates between the monolith substrate and catalytically active materials in the catalyst solution;
   e. exerting a vacuum on the pressure tight chamber;
   f. filling of the pressure tight chamber with the catalyst solution;
   g. maintaining the monolith substrate in contact with the catalyst solution for a time sufficient to insure that all available pore volume in the monolith substrate is filled with catalyst solution to obtain an impregnated monolith substrate;
   h. subsequently emptying the pressure tight chamber of the catalyst solution;
   i. removing the impregnated monolith substrate from the pressure tight chamber;
   j. excess catalyst solution from the impregnated monolith substrate; and,
   k. further drying and calcining the impregnated monolith substrate.

2. The method of claim 1 wherein the operational temperature is $(T_f+2°\ C.)<T_o<15°\ C.$ 3. The method of claim 2 wherein the operational temperature is $(T_f+2°\ C.)<T_o<0°\ C.$ 4. The method of claim 3 wherein the operational temperature is $(T_f+2°\ C.)<T_o<-5°\ C.$ 5. The method of claim 1 wherein the monolith substrate is a honeycomb structure having a plurality of cell channels between end faces thereof.

6. The method of claim 5 wherein the honeycomb structure is composed of gamma alumina.

* * * * *